United States Patent

Moliner et al.

[11] 3,997,754
[45] Dec. 14, 1976

[54] PROCESS FOR THE MANUFACTURE OF A HEAT EXCHANGE TUBE WITH SURFACES PROVIDED OF RADIAL WELDED STUDS

[75] Inventors: José Gasulla Moliner, Bilbao y; Amador Royo Rivas, Portugalete (Bilbao), both of Spain

[73] Assignee: "OGIPSA" Oleoductos, Gaseoductos e Instalaciones Petroliferas, S.A., Bilboa, Spain

[22] Filed: Apr. 9, 1974

[21] Appl. No.: 412,791

[52] U.S. Cl. .................................. 219/99; 219/98
[51] Int. Cl.² ........................................ B23K 9/20
[58] Field of Search ...................... 219/98, 99, 107

[56] References Cited
UNITED STATES PATENTS

| | | | |
|---|---|---|---|
| 1,982,098 | 11/1934 | Hartman | 219/99 X |
| 2,231,480 | 2/1941 | Pilger | 219/107 |
| 3,089,947 | 5/1963 | Frungel | 219/107 |
| 3,641,305 | 2/1972 | Ritter et al. | 219/107 X |
| 3,705,972 | 12/1972 | Trojani | 219/98 X |

Primary Examiner—J. V. Truhe
Assistant Examiner—N. D. Herkamp
Attorney, Agent, or Firm—Woodcock, Washburn, Kurtz & Mackiewicz

[57] ABSTRACT

A welding head is provided having a bore substantially larger than the shank of a rivet to be welded, and having a conical aperture for receiving the stud head. A copper-free sheath is disposed in the bore for receiving and locating the stud shank. In a preferred embodiment an associated magnet and switch are disposed within the welding head. When the stud-bearing head is brought into firm contact with a substrate current flows through the head, welding it to the substrate. The increased pressure upon the stud urges the magnet inwardly, operating the switch to control the equipment which locates the welding head.

5 Claims, 7 Drawing Figures

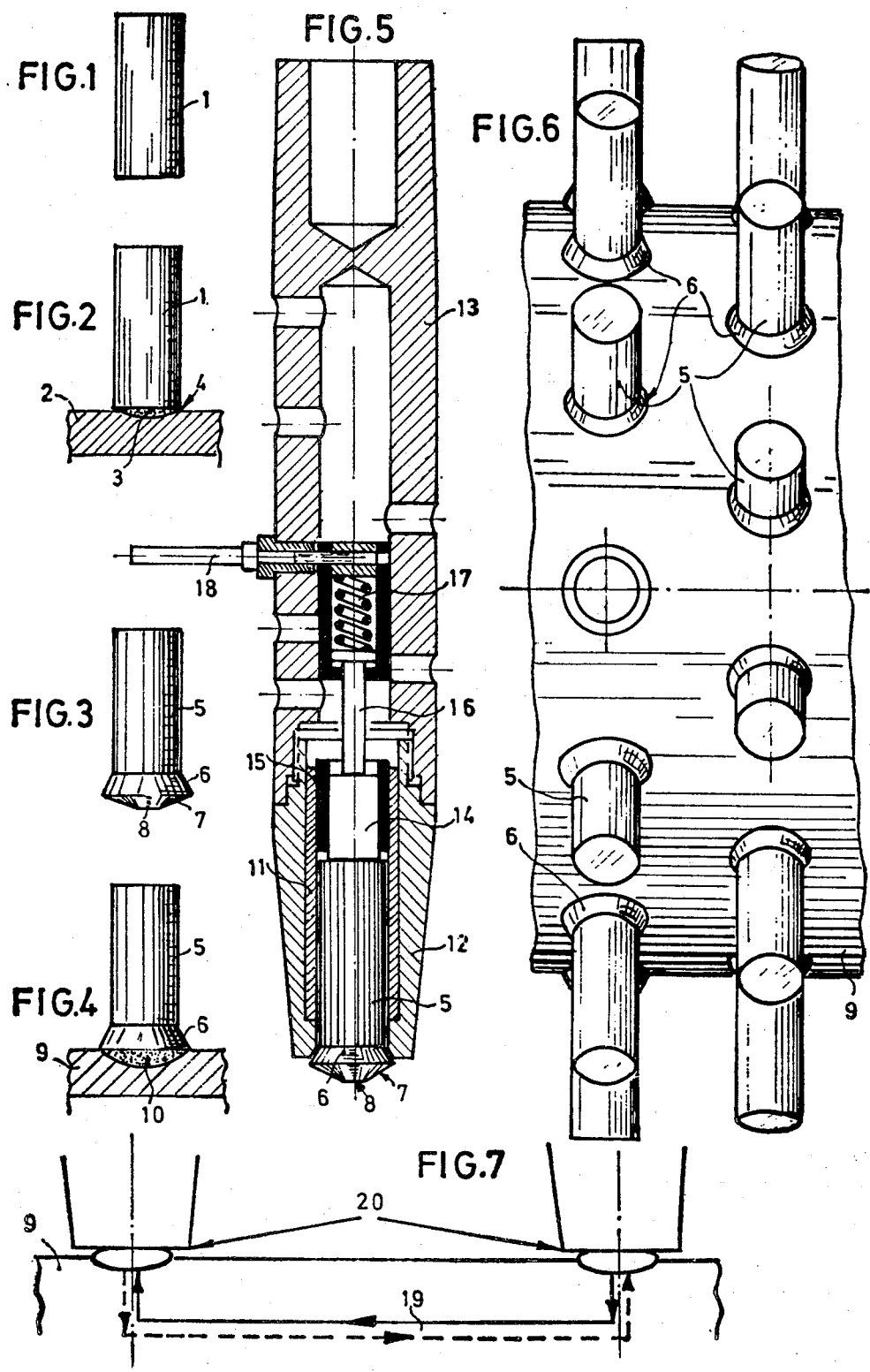

PROCESS FOR THE MANUFACTURE OF A HEAT EXCHANGE TUBE WITH SURFACES PROVIDED OF RADIAL WELDED STUDS

The fastening process of studs on the surface of heat exchange tubes known and used up to now, for example for supplementing the exchange surface in furnaces or boilers used in the petrochemical industry, consists in welding said small studs of cylinder form on the periphery of the tubes and in the longitudinal direction thereof, as well as studs of square, flat, oblong or elliptic configuration so as to obtain the desired exchange relation.

The tube bundles are generally assembled in rectangular or circular sets. The liquid or fluid to be heated flows through the tubes and the heated gas or the flames are in contact with the outside of the tubes and their projections. The latter, welded to the tubes, take in heat that the plain tubes are unable to absorb.

Thus the studs cover the tubes and are fastened generally in a staggered configuration, leaving between them a passage for the heat which in these conditions can be taken in by both tubes and studs.

It can be easily understood that the point will be to obtain always a greater exchange relation, in order to minimize the length and the number of the necessary tubes, since said tubes used to be made out of expensive chrome-nickel alloyed steel. Furthermore, the steel for the tubes and the studs will be selected according to the working temperature and the corrosiveness of the smokes with which they have to be in contact.

Beside the staggered configuration of the studs, the same can be formed as a continuous spiral a T, or angled formation.

Since, through the years, the furnaces for petrochemical applications were developed, with the use of special grade steel which allows the tube bundles to be submitted to the action of the flame and of high temperatures, the processes for welding studs known up to now are unable to achieve the internal union of these latter with the body of the tube. That is why the technical specifications of the manufacturers of furnaces required that the intimate contact between the abutting parts must reach approximately 85 percent of the stud section.

Hence these processes involved serious drawbacks which appeared during the use of these furnaces, such as:

substantial corrosion in the parts not welded or inadequately welded.

corrosion under tension, originated by a deposit of copper coming from the welding electrodes and produced by the friction of the studs against the internal walls of the latter.

As an example, we can say that a cylinder stud with a diameter of 12.5 mm, which actual section is 122.718 mm$^2$ presents an effective welding surface of only 104.310 mm$^2$, which match the above mentioned 85 percent.

When the current enters the stud through the end opposite to the end which is fastened to the tube, while the stud is introduced and maintained in the three fourth parts of its length in an electrode of copper, said electrode will be withdrawn with friction and, effectively, some traces of copper remain on the cylinder surface and the bottom of said stud opposite to the welded joint.

When the tube is working, this copper diffuses and enters the steel of the electrode through the incompletely welded joint if the steels are highly alloyed steels. Eventually a crack will suddenly be produced by the corrosion under tension owing to the localizated copper.

These observations have been made all the world around and the object of the present invention is precisely to suppress completely these important drawbacks, using an electrode designed for carrying out a process, by which an ideal heat exchange tube is finally obtained.

The process consists in using rectilinear studs, the end that is to be fastened and welded in the tube having an enlarged configuration which ends in an enlarged face; fastening this stud on the tube with a welding electrode of a matching profile of which at least the part of its surface designed to contact under pressure the stud body is free of copper, and conducting the flow of welding melted metal to the immediate proximity of the enlarged part.

A stud of cylinder section according to the condition above, will show, thus, an end which will give it the aspect of an embedded rivet. Optionally a flattening of the bulging zone can be provided.

The electrode provided for welding this stud has a sheath free of copper, with a section convenient for guiding the stud body, followed in its free end by an enlarged part of good electric conductibility and a profile such that it can be fastened on the matching enlarged part of the stud without presenting any guiding element which could exert a friction against the body of the stud.

The attached drawing represents, in the case of a cylindrical stud, the arrangement known up to now, and the arrangement according to the invention, as well as an embodiment of the related welding electrode and the tube thus obtained, all of them being shown only as examples.

FIGS. 1 and 2 are views of a conventional cylinder stud not welded, and welded in the wall of the tube, respectively.

FIGS. 3 and 4 are similar views of the cylinder stud according to the invention.

FIG. 5 is an axial section of the corresponding welding electrode.

FIG. 6 shows a short length of the heat exchange tube thus obtained.

FIG. 7 illustrates the flowing of current during the welding process according to the invention.

The conventional cylinder stud of FIG. 1 consists in a short straight cylinder 1.

As shown in FIG. 2, around the stud welded area 3 on the tube 2 using conventional process, calamine 4 is formed and results in a hazard of subsequent corrosion in its base, as well as of a reduction of the surface of contact in the proportions above mentioned.

The cylinder stud according to the invention (FIG. 3) terminates in one of its ends by a truncated cone 6, terminated by a bulging part 7, which ends in a slight flattening 8. This extremity is that which contacts under pressure the tube 9 (FIG. 4) and will be welded to it in 10, on a section more extended than the section of the proper body of the stud.

The welding process used will be apparent in the following description of the corresponding welding electrode.

As it will be seen later, this welded joint will be perfect, such that starting from a stud of, by example, a diameter of 12.5 mm, with a length of, say, 15 to 70 mm., and with an outside diameter of the enlarged part of 16 mm., by example, the part to be welded having a height of 2.5 mm., as a prolongation of a truncated cone of, say, 4 mm of height, we will have a surface of welded contact of 213.825 mm$^2$. This surface means an increase of 105 percent with regard to the welded surface in the case of the stud of FIGS. 1 and 2, which represents an important guarantee, according to present rules.

The process used to carry out the welded joint is the following.

According to FIG. 5, the stud which have the same reference numbers than in FIGS. 3 and 4, is guided by a sheath 11 made out of copper-free nickel, which is supported by a welding head 12 which surrounds the body of the stud only along a short height and conducts the welding current to the truncated cone head 6, which enlarged open aperture is adapted to the profile.

From now on we see that thanks to a pressure exerted on these elements towards the tube, not represented, the stud will be set against this tube and the melting of the bulged part will be produced.

Since the welding head has a better conductibility than the nickel sheath 11, it can be seen that said head will conduct the current in a preferential mode to head 6 of the stud.

Since the only object of the welding head 12 is to set under pressure the stud against the tube, its enlarged bearing surfaces only will be in a friction-free abutting position on the tube and a very short exceeding portion of the head orifice can present with regard to the guiding sheath 11 such a clearance that friction and metal deposit never can be produced. For this reason, the welding head can be made out of copper alloy, cobalt, beryllium, as well as copper, which has a conductivity 6 to 7 times better than nickel, the section of which in the exceeding portion will be very short here.

Thus no copper deposit will be allowed to form on the stud, since on the one hand the copper and its alloy will never reach its melting point and the only alternative possibility of production of a deposit, the frictional action, has been eliminated.

The assembly will be supported by a hollow cylindrical body 13, for example made out of the same copper alloy, which allows the electrode to be fastened in the welding device and the electric current to be conducted to the stud head which is completely introduced in the hollow body.

The stud is fastened provisionally by a magnet 14, which slides inside an insulated sleeve 15 which bears on the bottom of said stud. This magnet, through the shaft 16 and an intervening spring 17, contacts a microcontactor 18 which closes when the stud is pushed completely in the welding head (not shown).

The closing of this contact determines at the same time the opening of a valve (not represented) which controls the air pressure circuit of the electrode feeding cylinder and the connection of current when the welding head and the stud head contact each other.

While in FIG. 7 the flowing of current between two adjacents heads has been illustrated such as in 19 between two heads 20 through tube 9, in FIG. 6 a short length of this tube provided with studs 5, which enlarged portions 6 form a sleeve around their base, has been shown.

Thus, it is possible to weld studs of any grade to tubes of the same or different grade, such as for example stainless steel studs to carbon steel tubes or conversely.

When shaping the studs by cold pressing, the metal will flow always in the direction of rolling of the bars, which is most important, since this operation increases the shearing, folding and impact strength during the preparation of the tube bundles and their handling.

Since the current flows only through the stud heads, the welded joint is localized and is carried out in a short period, without giving time to the heating of the whole stud as in the known processes.

A strong cooling of the welding electrode will prohibit any deformation of its end which during the welding operation forges and enlarges the base of the stud, matching the melted metal to the exact shape of the electrode extremity, which corresponds furthermore to the shape of the stud head. All the studs are welded regularly and integrally to the tube along the whole length of its profile.

In the above matter, the advantages obtained from the point of view of the contact surfaces can be seen, and are demonstrated by the figures in the beginning of the specification.

Finally, it can be understood easily that owing to the special shape and the molding of the melted metal which is protected against air action by the shape of the electrode, a metallurgical welding quality, never reached up to now, is obtained owing to the fact that the whole electric power is concentrated in the welding point.

We claim:

1. A method of manufacturing a heat exchange tube including a body and a plurality of studs extending radially outwardly from the surface of said body, comprising the steps of:

providing a stud having an elongate shank and an enlarged head at one end thereof;

providing a welding head including an electrode having a bore substantially larger than the stud shank and terminating in a conical aperture which receives said enlarged head;

providing a copper-free sheath within said bore and disposed inwardly of said aperture so as to be displaced from the enlarged head of a stud seated in said welding head, said sheath being of a material having a substantially higher electrical resistance than the material of said electrode;

inserting the shank of said stud into said copper-free sheath, the head of said stud being received in said conical aperture;

applying pressure to said enlarged stud head by means of the conical surface of said aperture to urge said stud head against the heat exchange tube body; and transmitting electric current from the conical surface of said electrode aperture through said juxtaposed stud head and heat exchange body to weld said head and said body together, said conical aperture defining a cavity for retaining and shaping said stud head during the welding process.

2. The method according to claim 1, wherein said enlarged head comprises a generally convex face including a flattened portion at the center thereof.

3. The method according to claim 1, wherein the shank of said stud is cylindrical.

4. A method according to claim 1, further including the step of:

providing a magnetic element disposed within said sheath for retaining studs inserted therein.

5. A method according to claim 4, further including the steps of: providing switching means within said head in operative relationship with said magnet; contacting said magnet with an inserted end of the stud shank as the stud is inserted within said sheath; further urging said stud into said sheath upon the application of pressure to said stud head by said aperture in the urging of said stud against the heat exchange body, whereby the resulting displacement of said magnet operates said switching means.

* * * * *